United States Patent
Deshpande

(10) Patent No.: US 6,824,577 B2
(45) Date of Patent: Nov. 30, 2004

(54) NESTED COMPACT FUEL PROCESSOR FOR PRODUCING HYDROGEN RICH GAS

(75) Inventor: Vijay A. Deshpande, Houston, TX (US)

(73) Assignee: Texaco Inc., San Ramon, CA (US)

( * ) Notice: Subject to any disclaimer, the term of this patent is extended or adjusted under 35 U.S.C. 154(b) by 307 days.

(21) Appl. No.: 10/020,763

(22) Filed: Dec. 12, 2001

(65) Prior Publication Data

US 2002/0090328 A1 Jul. 11, 2002

Related U.S. Application Data

(60) Provisional application No. 60/255,027, filed on Dec. 12, 2000, and provisional application No. 60/261,232, filed on Jan. 12, 2001.

(51) Int. Cl.[7] ............... B01J 7/00; B01J 8/02; B01J 8/04
(52) U.S. Cl. ............ 48/127.9; 48/61; 422/188; 422/190; 422/191; 422/192; 422/193
(58) Field of Search ............ 48/61, 127.1, 127.9; 422/188, 189, 190, 191, 192, 193

(56) References Cited

U.S. PATENT DOCUMENTS

| | | | |
|---|---|---|---|
| 4,181,503 A | | 1/1980 | Lesieur et al. |
| 4,849,187 A | | 7/1989 | Uozu et al. |
| 4,943,493 A | * | 7/1990 | Vartanian ............... 429/17 |
| 5,458,857 A | * | 10/1995 | Collins et al. ............ 422/198 |
| 5,861,137 A | * | 1/1999 | Edlund ............... 423/652 |
| 5,927,063 A | * | 7/1999 | Janda et al. ............ 60/780 |
| 6,413,479 B1 | * | 7/2002 | Kudo et al. ............ 422/198 |
| 6,641,625 B1 | * | 11/2003 | Clawson et al. ......... 48/127.9 |
| 2002/0083646 A1 | | 7/2002 | Deshpande et al. ..... 48/197 FM |
| 2002/0088740 A1 | | 7/2002 | Krause et al. ............ 208/46 |
| 2002/0090326 A1 | | 7/2002 | Deshpande ............ 422/190 |
| 2002/0090327 A1 | | 7/2002 | Deshpande ............ 422/190 |
| 2002/0090334 A1 | | 7/2002 | Stevens et al. ............ 423/247 |
| 2002/0094310 A1 | | 7/2002 | Krause et al. ............ 422/191 |
| 2002/0098129 A1 | | 7/2002 | Martin et al. ............ 422/173 |

* cited by examiner

Primary Examiner—Alexa Doroshenk
(74) Attorney, Agent, or Firm—Frank C. Turner; Howrey Simon, et al.

(57) ABSTRACT

An apparatus for carrying out a multi-step process of converting hydrocarbon fuel to a substantially pure hydrogen gas feed includes a plurality of modules arranged in a nested manner along a common axis. The multi-step process includes: providing a fuel processor having a plurality of modules arranged so that they are nested one within the other; and feeding the hydrocarbon fuel successively through each of the modules in the reactor to produce the hydrogen rich gas.

13 Claims, 3 Drawing Sheets

NESTED COMPACT FUEL PROCESSOR FOR PRODUCING HYDROGEN RICH GAS

BACKGROUND OF THE INVENTION

Fuel cells provide electricity from chemical oxidation-reduction reactions and possess significant advantages over other forms of power generation in terms of cleanliness and efficiency. Typically, fuel cells employ hydrogen as the fuel and oxygen as the oxidizing agent. The power generation is proportional to the consumption rate of the reactants.

A significant disadvantage which inhibits the wider use of fuel cells is the lack of a widespread hydrogen infrastructure. Hydrogen has a relatively low volumetric energy density and is more difficult to store and transport than the hydrocarbon fuels currently used in most power generation systems. One way to overcome this difficulty is the use of reformers to convert the hydrocarbons to a hydrogen rich gas stream which can be used as a feed for fuel cells.

Hydrocarbon-based fuels, such as natural gas, LPG, gasoline, and diesel, require conversion processes to be used as fuel sources for most fuel cells. Current art uses multi-step processes combining an initial conversion process with several clean-up processes. The initial process is most often steam reforming (SR), autothermal reforming (ATR), catalytic partial oxidation (CPOX), or non-catalytic partial oxidation (POX). The clean-up processes are usually comprised of a combination of desulfurization, high temperature water-gas shift, low temperature water-gas shift, selective CO oxidation, or selective CO methanation. Alternative processes include hydrogen selective membrane reactors and filters.

Despite the above work, there remains a need for a simple unit for converting a hydrocarbon fuel to a hydrogen rich gas stream for use in conjunction with a fuel cell.

SUMMARY OF THE INVENTION

The present invention is generally directed to an apparatus and method for converting hydrocarbon fuel into a hydrogen rich gas. In one illustrative embodiment of the present invention, the apparatus for converting hydrocarbon fuel into hydrogen rich gas includes a plurality of modules arranged radially along a common axis. Such an arrangement permits a compact design and highly efficient heat transfer between differing reactor modules. Depending upon the reaction taking place within the module, each module may include an annular layer of thermally insulating material disposed between the shell and the respective processing core. In a similar manner, a module may include a porous support member, such as screen, mesh, perforated plate, or porous sintered plate. Such a porous support member may be included so as to support and contain the contents of the module, particularly granular catalyst materials.

As noted above and described herein, the apparatus of the present invention is used to carry out a series of reactions that converts hydrocarbon fuel to hydrogen rich gas. In one illustrative embodiment of such an apparatus, the first module preferably has a processing core that includes a partial oxidation catalyst or alternatively a steam reforming catalyst or alternatively an autothermal reforming catalyst or alternatively combinations and/or mixtures of such catalysts. A second module positioned adjacent to the first module is preferably designed so that the processing core of the second module includes a first heat exchanger. Such a heat exchanger may be a fin-typed heat exchanger, tubing heat exchanger, heat pipe, or similar means that are capable of exchanging heat.

Within the plurality of modules, a third module is preferably positioned adjacent to the second module, the processing core of the third module including a desulfurizing agent. A wide variety of desulfurizing agents may be used but preferably the desulfurizing agent includes zinc oxide. A fourth module positioned adjacent to and in fluid communication with the third module includes a processing core containing a water gas shift catalyst. One of skill in the art should understand and appreciate that the water gas shift catalyst may be a low temperature water gas shift catalyst that includes a catalyst material selected from copper, copper oxide, zinc, platinum, rhenium, palladium, rhodium, and gold and combinations and mixtures of these an similar materials. Alternatively, the water gas shift catalyst is a high temperature water gas shift catalyst that includes a catalyst material selected from ferric oxide, chromic oxide, copper, iron silicide, platinum, palladium and other platinum group members, and combinations and mixtures of these and similar materials.

The apparatus is further designed to include within the plurality of modules a fifth module positioned adjacent to and in fluid communication with the fourth module. The processing core of the fifth module includes a second heat exchanger. Such a heat exchanger may include a fin-typed heat exchanger, tubing heat exchanger, heat pipe, or similar means that are capable of exchanging heat.

The plurality of modules further includes a sixth module positioned adjacent to the fifth module with which it is in fluid communication. The processing core of the sixth module includes a carbon monoxide oxidation catalyst that preferably includes a material selected from platinum, palladium, iron, chromium, manganese, iron oxide, chromium oxide, manganese oxide, ruthenium, gold, cerium, lanthanum, and combinations and mixtures of these and similar compounds.

The present invention also includes a process for converting hydrocarbon fuel into a hydrogen rich gas. One such illustrative process utilizes the apparatus disclosed herein. Such a process generally includes providing a fuel processor having a plurality of modules arranged radially along a common axis, each forming an annular reaction chamber. By feeding the hydrocarbon fuel successively through each of the above described modules in an generally radial direction a hydrogen rich gas is produced in a manner that optimizes space considerations and heat transfer considerations.

BRIEF DESCRIPTION OF THE DRAWINGS

The description is presented with reference to the accompanying drawings in which.

DESCRIPTION OF ILLUSTRATIVE EMBODIMENTS

The present invention is generally directed to an apparatus for converting hydrocarbon fuel into a hydrogen rich gas. In a preferred aspect, the apparatus and method described herein relate to a compact processor for producing a hydrogen rich gas stream from a hydrocarbon fuel for use in fuel cells. However, other possible uses are contemplated for the apparatus and method described herein, including any use wherein a hydrogen rich stream is desired. Accordingly, while the invention is described herein as being used in conjunction with a fuel cell, the scope of the invention is not limited to such use.

Each of the illustrative embodiments of the present invention describe a fuel processor or a process for using such a fuel processor with the hydrocarbon fuel feed being directed through the fuel processor. The hydrocarbon fuel may be liquid or gas at ambient conditions as long as it can be vaporized. As used herein the term "hydrocarbon" includes organic compounds having C—H bonds which are capable of producing hydrogen from a partial oxidation or steam reforming reaction. The presence of atoms other than carbon and hydrogen in the molecular structure of the compound is not excluded. Thus, suitable fuels for use in the method and apparatus disclosed herein include, but are not limited to hydrocarbon fuels such as natural gas, methane, ethane, propane, butane, naphtha, gasoline, and diesel fuel, and alcohols such as methanol, ethanol, propanol, and the like.

The fuel processor feeds include hydrocarbon fuel, oxygen, and water. The oxygen can be in the form of air, enriched air, or substantially pure oxygen. The water can be introduced as a liquid or vapor. The composition percentages of the feed components are determined by the desired operating conditions, as discussed below.

The fuel processor effluent stream from of the present invention includes hydrogen and carbon dioxide and can also include some water, unconverted hydrocarbons, carbon monoxide, impurities (e.g. hydrogen sulfide and ammonia) and inert components (e.g., nitrogen and argon, especially if air was a component of the feed stream).

Figure 1:
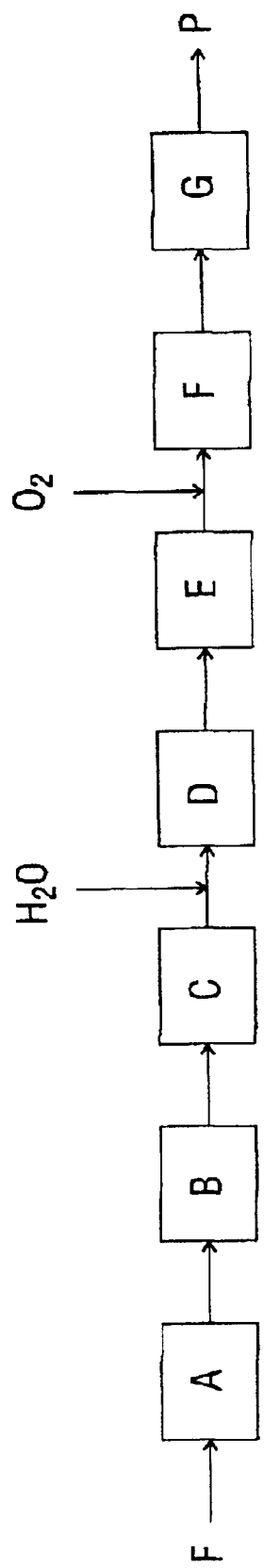
FIG. 1 depicts a simple process flow diagram for one illustrative embodiment of the present invention.

FIG. 1 depicts a general process flow diagram illustrating the process steps included in the illustrative embodiments of the present invention. One of skill in the art should appreciate that a certain amount of progressive order is needed in the flow of the reactants through the reactors disclosed herein.

Process step A is an autothermal reforming process in which two reactions, partial oxidation (formula I, below) and optionally also steam reforming (formula II, below), are combined to convert the feed stream F into a synthesis gas containing hydrogen and carbon monoxide. Formulas I and II are exemplary reaction formulas wherein methane is considered as the hydrocarbon:

$$CH_4 + \tfrac{1}{2}O_2 \rightarrow 2H_2 + CO \tag{I}$$

$$CH_4 + H_2O \rightarrow 3H_2 + CO \tag{II}$$

The partial oxidation reaction occurs very quickly to the complete conversion of oxygen added and produces heat. The steam reforming reaction occurs slower and consumes heat. A higher concentration of oxygen in the feed stream favors partial oxidation whereas a higher concentration of water vapor favors steam reforming. Therefore, the ratios of oxygen to hydrocarbon and water to hydrocarbon become characterizing parameters. These ratios affect the operating temperature and hydrogen yield.

The operating temperature of the autothermal reforming step can range from about 550° C. to about 900° C., depending on the feed conditions and the catalyst. The invention uses a catalyst bed of a partial oxidation catalyst with or without a steam reforming catalyst. The catalyst may be in any form including pellets, spheres, extrudate, monoliths, and the like. Partial oxidation catalysts should be well known to those with skill in the art and are often comprised of noble metals such as platinum, palladium, rhodium, and/or ruthenium on an alumina washcoat on a monolith, extrudate, pellet or other support. Non-noble metals such as nickel or cobalt have been used. Other washcoats such as titania, zirconia, silica, and magnesia have been cited in the literature. Many additional materials such as lanthanum, cerium, and potassium have been cited in the literature as "promoters" that improve the performance of the partial oxidation catalyst.

Steam reforming catalysts should be known to those with skill in the art and can include nickel with amounts of cobalt or a noble metal such as platinum, palladium, rhodium, ruthenium, and/or iridium. The catalyst can be supported, for example, on magnesia, alumina, silica, zirconia, or magnesium aluminate, singly or in combination. Alternatively, the steam reforming catalyst can include nickel, preferably supported on magnesia, alumina, silica, zirconia, or magnesium aluminate, singly or in combination, promoted by an alkali metal such as potassium.

Process step B is a cooling step for cooling the synthesis gas stream from process step A to a temperature of from about 200° C. to about 600° C., preferably from about 300° C. to about 500° C., and more preferably from about 375° C. to about 425° C., to optimize the temperature of the synthesis gas effluent for the next step. This cooling may be achieved with heat sinks, heat pipes or heat exchangers depending upon the design specifications and the need to recover/recycle the heat content of the gas stream. One illustrative embodiment for step B is the use of a heat exchanger utilizing feed stream F as the coolant circulated through the heat exchanger. The heat exchanger can be of any suitable construction known to those with skill in the art including shell and tube, plate, spiral, etc. Alternatively, or in addition thereto, cooling step B may be accomplished by injecting additional feed components such as fuel, air or water. Water is preferred because of its ability to absorb a large amount of heat as it is vaporized to steam. The amounts of added components depend upon the degree of cooling desired and are readily determined by those with skill in the art.

Process step C is a purifying step. One of the main impurities of the hydrocarbon stream is sulfur, which is converted by the autothermal reforming step A to hydrogen sulfide. The processing core used in process step C preferably includes zinc oxide and/or other material capable of absorbing and converting hydrogen sulfide, and may include a support (e.g., monolith, extrudate, pellet etc.). Desulfurization is accomplished by converting the hydrogen sulfide to water in accordance with the following reaction formula III:

$$H_2S + ZnO \rightarrow H_2O + ZnS \tag{III}$$

Other impurities such as chlorides can also be removed. The reaction is preferably carried out at a temperature of from about 300° C. to about 500° C., and more preferably from about 375° C. to about 425° C. Zinc oxide is an effective hydrogen sulfide absorbent over a wide range of temperatures from about 25° C. to about 700° C. and affords great flexibility for optimizing the sequence of processing steps by appropriate selection of operating temperature.

The effluent stream may then be sent to a mixing step D in which water is optionally added to the gas stream. The addition of water lowers the temperature of the reactant stream as it vaporizes and supplies more water for the water gas shift reaction of process step E (discussed below). The water vapor and other effluent stream components are mixed by being passed through a processing core of inert materials such as ceramic beads or other similar materials that effectively mix and/or assist in the vaporization of the water. Alternatively, any additional water can be introduced with feed, and the mixing step can be repositioned to provide better mixing of the oxidant gas in the CO oxidation step G disclosed below.

Process step E is a water gas shift reaction that converts carbon monoxide to carbon dioxide in accordance with formula IV:

$$H_2O + CO \rightarrow H_2 + CO_2 \quad (IV)$$

This is an important step because carbon monoxide, in addition to being highly toxic to humans, is a poison to fuel cells. The concentration of carbon monoxide should preferably be lowered to a level that can be tolerated by fuel cells, typically below 50 ppm. Generally, the water gas shift reaction can take place at temperatures of from 150° C. to 600° C. depending on the catalyst used. Under such conditions, most of the carbon monoxide in the gas stream is converted in this step.

Low temperature shift catalysts operate at a range of from about 150° C. to about 300° C. and include for example, copper oxide, or copper supported on other transition metal oxides such as zirconia, zinc supported on transition metal oxides or refractory supports such as silica, alumina, zirconia, etc., or a noble metal such as platinum, rhenium, palladium, rhodium or gold on a suitable support such as silica, alumina, zirconia, and the like.

High temperature shift catalysts are preferably operated at temperatures ranging from about 300° to about 600° C. and can include transition metal oxides such as ferric oxide or chromic oxide, and optionally including a promoter such as copper or iron silicide. Also included, as high temperature shift catalysts are supported noble metals such as supported platinum, palladium and/or other platinum group members.

The processing core utilized to carry out this step can include a packed bed of high temperature or low temperature shift catalyst such as described above, or a combination of both high temperature and low temperature shift catalysts. The process should be operated at any temperature suitable for the water gas shift reaction, preferably at a temperature of from 150° C. to about 400° C. depending on the type of catalyst used. Optionally, a cooling element such as a cooling coil may be disposed in the processing core of the shift reactor to lower the reaction temperature within the packed bed of catalyst. Lower temperatures favor the conversion of carbon monoxide to carbon dioxide. Also, a purification processing step C can be performed between high and low shift conversions by providing separate steps for high temperature and low temperature shift with a desulfurization module between the high and low temperature shift steps.

Process step F is a cooling step performed in one embodiment by a heat exchanger. The heat exchanger can be of any suitable construction including shell and tube, plate, spiral, etc. Alternatively a heat pipe or other form of heat sink may be utilized. The goal of the heat exchanger is to reduce the temperature of the gas stream to produce an effluent having a temperature preferably in the range of from about 90° C. to about 150° C.

Oxygen is added to the process in step F. The oxygen is consumed by the reactions of process step G described below. The oxygen can be in the form of air, enriched air, or substantially pure oxygen. The heat exchanger may by design provide mixing of the air with the hydrogen rich gas. Alternatively, the embodiment of process step D may be used to perform the mixing.

Process step G is an oxidation step wherein almost all of the remaining carbon monoxide in the effluent stream is converted to carbon dioxide. The processing is carried out in the presence of a catalyst for the oxidation of carbon monoxide and may be in any suitable form, such as pellets, spheres, monolith, etc. Oxidation catalysts for carbon monoxide are known and typically include noble metals (e.g., platinum, palladium) and/or transition metals (e.g., iron, chromium, manganese), and/or compounds of noble or transition metals, particularly oxides. A preferred oxidation catalyst is platinum on an alumina washcoat. The washcoat may be applied to a monolith, extrudate, pellet or other support. Additional materials such as cerium or lanthanum may be added to improve performance. Many other formulations have been cited in the literature with some practitioners claiming superior performance from rhodium or alumina catalysts. Ruthenium, palladium, gold, and other materials have been cited in the literature as being active for this use.

Two reactions occur in process step G: the desired oxidation of carbon monoxide (formula V) and the undesired oxidation of hydrogen (formula VI) as follows:

$$CO + \tfrac{1}{2}O_2 \rightarrow CO_2 \quad (V)$$

$$H_2 + \tfrac{1}{2}O_2 \rightarrow H_2O \quad (VI)$$

The preferential oxidation of carbon monoxide is favored by low temperatures. Since both reactions produce heat it may be advantageous to optionally include a cooling element such as a cooling coil disposed within the process. The operating temperature of process is preferably kept in the range of from about 90° C. to about 150° C. Process step G preferably reduces the carbon monoxide level to less than 50 ppm, which is a suitable level for use in fuel cells, but one of skill in the art should appreciate that the present invention can be adapted to produce a hydrogen rich product with of higher and lower levels of carbon monoxide.

The effluent exiting the fuel processor is a hydrogen rich gas containing carbon dioxide and other constituents which may be present such as water, inert components (e.g., nitrogen, argon), residual hydrocarbon, etc. Product gas may be used as the feed for a fuel cell or for other applications where a hydrogen rich feed stream is desired. Optionally, product gas may be sent on to further processing, for example, to remove the carbon dioxide, water or other components.

In one illustrative embodiment of the present invention, the fuel processor is of modular construction with individual modular units, which are separable, rearrangeable, and individually replaceable. The modular units may be used in any orientation, e.g., vertical or horizontal orientation, and is adapted to be used in conjunction with a fuel cell such that the hydrogen rich product gas of the reactor described herein is supplied directly to a fuel cell as a feed stream. While the modules can have any cross sectional configuration, such as circular, rectangular, triangular, etc., a circular cross section is preferred with the overall reactor being of a generally tubular shape.

The modules are constructed in accordance with the description given below. The modules can be fabricated from any material capable of withstanding the operating conditions and chemical environment of the reactions described herein and can include, for example, stainless steel, Inconel, Incoloy, Hastelloy, and the like. The reaction pressure is preferable from about 0 to about 100 psig, although higher pressures may be employed. The operating pressure of the fuel processor depends upon the delivery pressure required by the fuel cell. For fuel cells operating in the 1 to 20 kW range an operating pressure of 0 to about 100 psig is generally sufficient. The modules are of such dimensions so as to safely contain the reaction at the desired operating pressures and temperatures.

Figure 2:
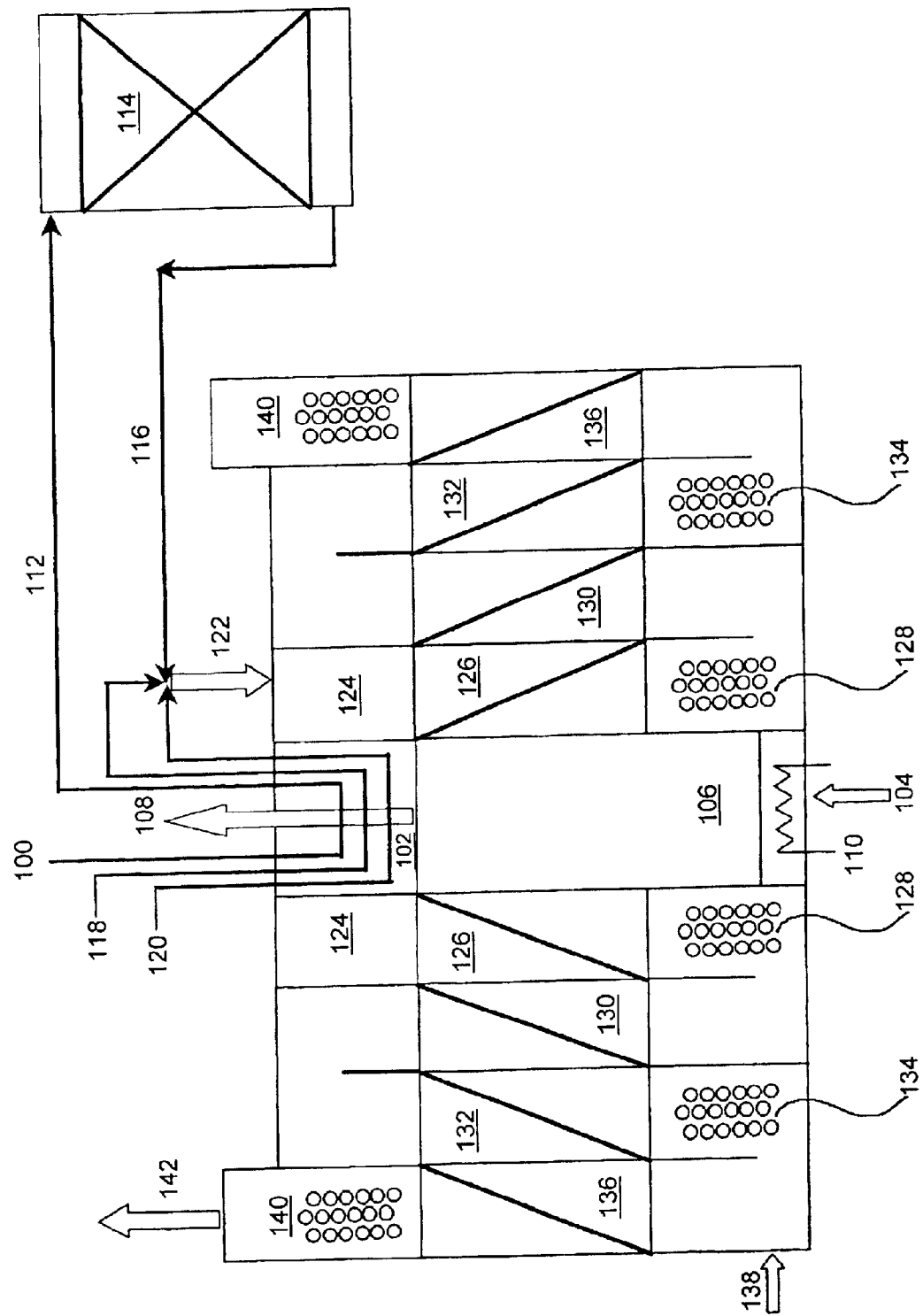
FIG. 2 depicts a first illustrative embodiment of a compact fuel processor apparatus of the present invention.

Depicted in FIG. 2 is one illustrative embodiment of the present invention in which a single stack of nested reactors is utilized as a fuel processor. Fuel feed stream 100 is preheated in a first heat exchanger 102 which is heated by the catalytic combustion of the anode tail gas 104 generated by a fuel cell in the anode tail gas oxidation reactor 106. The catalytic combustion reaction is carried out in the anode tail gas oxidation reactor using a suitable supported catalyst. Such supported catalysts oxidation are well known in the art and may be in any suitable form, such as pellets, spheres, monolith, etc. Oxidation catalysts for carbon monoxide are known and typically include noble metals (e.g., platinum, palladium) and/or transition metals (e.g., iron, chromium, manganese), and/or compounds of noble or transition metals, particularly oxides. A preferred oxidation catalyst is platinum on an alumina washcoat. The washcoat may be applied to a monolith, extrudate, pellet or other support. Additional materials such as cerium or lanthanum may be added to improve performance. Many other formulations have been cited in the literature with some practitioners claiming superior performance from rhodium or alumina catalysts. Ruthenium, palladium, gold, and other materials have been cited in the literature as being active for this use. Thus hot exhaust 108 generated by the catalytic oxidation of the anode tail gas pre-heats the fuel to give a preheated fuel feed 112. The pre-heated fuel feed is passed through a first desulfurization unit 114 so as to substantially remove any sulfur containing compounds from the fuel. The desulfurized fuel 116 is then combined with air or another suitable oxygen source 118 and water/steam 120 to form a fuel/air/water mixture 122. The fuel/air/water mixture is introduced into the reformation stack, distributed and pre-heated in the distribution manifold 124. The preheated fuel/air/water mixture is introduced into the auto-thermal reformation reactor 126 and undergoes reformation into a hydrogen containing gas. The hydrogen containing gas is first cooled by a second heat exchanger 128 and then desulfurized in the second desulfurization reactor 130. The resulting desulfurized hydrogen containing gas is then subjected to a water-gas shift reaction in the shift reactor 132. The hydrogen containing gas exiting the shift reactor 132 is cooled by a third heat exchanger 134 and then combined with an oxygen source, such as air source 138, and then passed through a preferential oxidation reactor 136 so as to substantially remove trace amounts of carbon monoxide that may be present in the hydrogen containing gas. The hydrogen containing gas exiting the preferential oxidation reactor is subjected to cooling in a fourth heat exchanger 140 before exiting the reactor as hydrogen rich gas 142. The hydrogen containing gas is preferably used in a fuel cell or may be stored or used in other processes that should be apparent to one of skill in the art.

Upon careful examination of FIG. 2, one of skill in the art should note that except for the first desulfurization step, substantially all of the reactors in the fuel processor are nested one inside the other. The order of nesting as illustrated is designed so as to maximize the heat exchange between exothermic reactors and endothermic reactors. Thus the nested reactors achieve an optimized thermal exchange balance that optimizes the efficiency of the fuel processor in an overall compact area. In order to start-up the fuel reformer, electric pre-heater 110 may be used to pre-heat anode tail gas or some other suitable alternative startup fuel to initiate the reaction within the anode tail gas oxidation reactor. It should also be noted that the general flow of reactants through the fuel processor is proceeding from an inner core reactor to outer surrounding reactors in a "radial manner". A similar result may also be achieved by use of partially porous reactor walls made of refractory materials.

One of skill in the art after reviewing the above description should understand and appreciate that each module performs a separate operational function and is generally configured as shown in FIG. 2. Feed stream F (100) is introduced through inlet pipe (not shown) and product gas P (142) is drawn off via outlet pipe (not shown). Module 126 is the autothermal-reforming module corresponding to process step A of FIG. 1. The autothermal-reforming module has built into it a heat exchanger 128 that cools the outgoing product gas which corresponds to process step B of FIG. 1. Module 130 is a purifying module corresponding to process step C of FIG. 1. Module 132 is a water gas shift module corresponding to process step E of FIG. 1. The cooling step corresponding to process step F of FIG. 1 is carried out by vertical finned heat exchanger 134. Module 136 is a preferential oxidation step corresponding to process step G of FIG. 1. Air source 138 provides a source for oxygen to process gas for the oxidation reaction (Equation V) of Module 136. Module 136 also contains a heat exchanger 140 (partially shown) positioned within or surrounding the catalyst bed so as to maintain a desired oxidation reaction temperature. One of skill in the art should appreciate that the process configuration described in this embodiment may vary depending on numerous factors, including but not limited to feedstock quality and required product quality.

Figure 3:
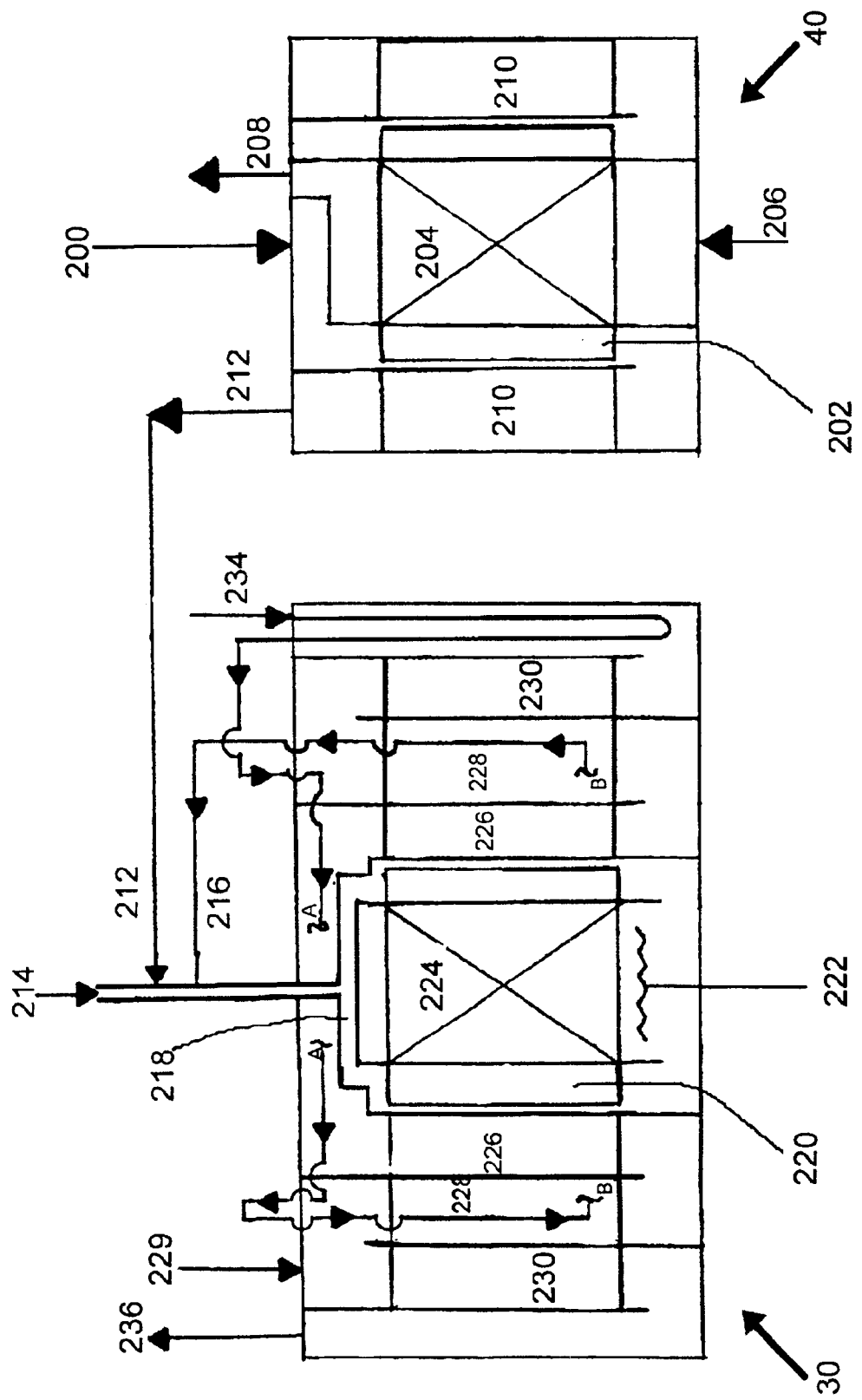
FIG. 3 depicts a second illustrative embodiment of a compact fuel psocessor apparatus of the present invention.

Turning now to FIG. 3, an alternative illustrative embodiment of a dual stack fuel processor is shown in which there is a reforming stack 30 and a oxidizing stack 40. As will become apparent below, the reforming stack 30 generally carries out the reformation process in which fuel is converted into suitably pure hydrogen gas for use with a fuel cell (not shown). The oxidation stack generally serves as a means for recovering the heat content of the anode tail gas generated by the fuel cell and preheats the fuel for the reforming stack.

Fuel 200 is provided to the reforming stack 40 that includes two major components, the anode tail gas oxidation reactor 204 and the desulfuriztion reaction 210. The anode tail gas oxidation reactor is designed such that it catalytically oxidizes the anode tail gas 206 generated from a fuel cell. The heat generated is transferred to the fuel 200 by vertical fin heat exchangers 202 generating a cooled exhaust 208. The heated fuel is then subjected to a desulfurization reactor 210 that substantially removes the sulfur compounds present in the fuel. The desulfurized fuel 212 is provided to the reforming stack 30 and combined with air 214 and hot water/steam 216. This mixture of fuel/air/water passes through a distribution manifold 218 which directs the mixture through a vertical fin heat exchanger 220. The pre heated fuel/air/water mixture is then introduced into the auto-thermal reformation reactor 224. During start-up, an electrical pre-heater element 222 is installed at the bottom of the auto-thermal reformation reactor. However, once started the heat generated by the auto-thermal reformation reactor is sufficient to heat the fuel/air/water mixture via the vertical finned heat exchangers 220. The product gas from the auto-thermal reforming reactor is directed to a second desulfurization reactor 226 which removes any remaining sulfur compounds from the gas product stream. The desulfurized gas is then introduced into the water-gas shift reactor 228. The temperature of the shift reactor is controlled by tube heat exchangers 234. It should be noted at this point that the heat exchanger in the present illustrative embodiment is designed as one continuous tube routed throughout the reforming stack. Points A and B are respectively connected to each other such that the flow of water through the tube is continuous. After passing through the shift reactor, air 229 is mixed with the hydrogen containing gas and passed to a preferential oxidation reactor 230. In the preferential oxidation reactor trace amounts of carbon monoxide are removed so as to purify the hydrogen containing gas for use in a fuel cell. The product gas if further cooled by heat exchanger coils 234 and leaves the reforming stack as hydrogen containing gas 236. The hydrogen containing gas is preferably used in a fuel cell or may be stored or used in other processes that should be apparent to one of skill in the art.

One of skill in the art after reviewing the above description of FIG. 3 should understand and appreciate that each module performs a separate operational function. Feed stream F (200) is introduced through inlet pipe (not shown) and product gas P (236) is drawn off via outlet pipe (not shown). Module 224 is the autothermal reforming module corresponding to process step A of FIG. 1. The autothermal reforming module has built into it a vertical fin heat exchanger the simultaneously heats the incoming fuel mixture and cools the outgoing product gas which corresponds to process step B of FIG. 1. An electric heater 222, is installed at the bottom inlet of the autothermal reformation reactor for start-up heat. Module 226 is a purifying module corresponding to process step C of FIG. 1. Module 228 is a water gas shift module corresponding to process step E of FIG. 1. The cooling step corresponding to process step F of FIG. 1 is carried out by finned tube heat exchanger 232. In this illustrative embodiment, heat exchanger 232 is shown as a general heat sink for the entire reforming stack, however, one of skill in the art could redesign the heat exchangers to have multiple flows and heat exchangers. Module 230 is an oxidation step corresponding to process step G of FIG. 1. Air source 229 provides a source for oxygen to process gas for the oxidation reaction (Equation V) of Module 230. Module 230 also contains a heat exchanger 232 (partially shown) positioned within or surrounding the catalyst bed so as to maintain a desired oxidation reaction temperature. One of skill in the art should appreciate that the process configuration described in this embodiment may vary depending on numerous factors, including but not limited to feedstock quality and required product quality.

In view of the above disclosure, one of ordinary skill in the art should understand and appreciate that the present invention includes many possible illustrative embodiments that depend upon design criteria. One such illustrative embodiment includes a compact fuel processor for converting a hydrocarbon fuel feed into hydrogen rich gas, in which the fuel processor assembly includes multiple concentric vessels for converting the hydrocarbon fuel feed into the hydrogen rich gas. The hydrogen rich gas thus generated is suitable for direct feed to a fuel cell or may be stored for use later or may be used in processes or reactions that utilize hydrogen gas as a feed stock.

In such an illustrative embodiment, the processor assembly itself includes: an oxidation core vessel containing an oxidation catalyst; a reforming vessel surrounding the oxidation core vessel and forming a first annular space filled with autothermal reforming catalyst; a desulfurizing vessel surrounding the reforming vessel and forming a second annular space filled with desulfurization catalyst; a shift vessel surrounding the desulfurizing vessel and forming a third annular space filled with water gas shift catalyst; and a preferred oxidation vessel surrounding the shift vessel and forming a fourth annular space filled with preferred oxidation catalyst. The above reactor areas, except for the oxidation core vessel, are in fluid communication with each other so as to carry out the desired fuel processing reactions needed to generate substantially pure hydrogen gas. The oxidation core vessel oxidizes fuel cell anode tail gas or alternatively another suitable fuel such as natural gas, to produce a hot exhaust gas. The hot exhaust gas in-turn preheats the hydrocarbon fuel that is utilized in the fuel reformation reactions. In one preferred illustrative embodiment, an electric heater is present for preheating the anode tail gas prior to introducing the anode tail gas to the oxidation core vessel. The illustrative compact fuel processor may include an external desulfurizing vessel for desulfurizing the hydrocarbon fuel feed. Preferably the second desulfurizing vessel is a replaceable canister so that it is serviceable without having to disassemble the nested fuel processor stack. In the present illustrative embodiment, the hydrocarbon fuel feed is sequentially introduced to the first annular space, then to the second annular space, then to the third annular space, and then to the fourth annular space to produce the hydrogen rich gas. A plurality of cooling coils for removing the heat of reaction produced in the first annular space, the second annular space, the third annular space, and the fourth annular space are preferably employed in the illustrative embodiment so as to efficiently distribute the heat generated by the exothermic reaction and the heat requirements of the endothermic reactions. A circulating coolant flows through the cooling coils and preferably the circulating coolant is selected from air, water, the hydrocarbon fuel feed, combinations and mixtures of these and similar items. In one preferred illustrative embodiment each annular space is surrounded by heat resisting refractory. Thus the heat transfer between annular spaces is controlled and the overall heat efficiency of the fuel processor can be optimized.

Yet another illustrative embodiment of the present invention is a compact fuel processor for converting a hydrocarbon fuel feed into hydrogen rich gas, that includes a heat exchanger coil; a reforming core vessel containing an autothermal reforming catalyst bed; a desulfurizing vessel surrounding the reforming core vessel and forming a first annular space filled with desulfurization catalyst; a shift vessel surrounding the desulfurizing vessel and forming a second annular space filled with water gas shift catalyst; and a preferred oxidation vessel surrounding the shift vessel and forming a third annular space filled with preferred oxidation catalyst. Such an illustrative compact fuel processor is designed such that the hydrocarbon fuel feed is preheated by the hydrogen rich gas in the heat exchanger coil to produce a preheated hydrocarbon fuel feed; and the preheated hydrocarbon fuel feed is sequentially introduced to the reforming core vessel, then to the second annular space, then to the third annular space, and then to the fourth annular space to produce the hydrogen rich gas.

It is preferred within this illustrative embodiment that the reforming core vessel has a set of external vertical fins for further preheating the preheated hydrocarbon fuel feed to produce a second preheated hydrocarbon fuel feed. Thus, the second preheated hydrocarbon fuel feed becomes the preheated hydrocarbon fuel feed introduced to the reforming core vessel. It should also be noted that the second annular space may have a second heat exchanger coil for reaction temperature control. Further the present illustrative embodiment can include an electrical heater for starting up the autothermal reforming catalyst bed.

While the apparatus, compositions and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A compact fuel processor for converting a hydrocarbon fuel feed into hydrogen rich gas suitable for direct feed to a fuel cell, the compact fuel processor comprising a processor assembly containing multiple concentric vessels for converting the hydrocarbon fuel feed into the hydrogen rich gas, the processor assembly comprising:

an oxidation core vessel containing an oxidation catalyst;

a reforming vessel surrounding the oxidation core vessel and forming a first annular space filled with autothermal reforming catalyst;

a desulfurizing vessel surrounding the reforming vessel and forming a second annular space filled with desulfurization catalyst; and a shift vessel surrounding the desulfurizing vessel and forming a third annular space filled with water gas shift catalyst.

2. The compact fuel processor of claim 1, further comprising a second desulfurizing vessel external to the processor assembly for desulfurizing the hydrocarbon fuel feed.

3. The compact fuel processor of claim 2, wherein the second desulfurizing vessel is a replaceable canister.

4. The processor of claim 1, wherein the processor assembly further comprises a preferred oxidation vessel surrounding the shift vessel and forming a fourth annular space filled with preferred oxidation catalyst.

5. The compact fuel processor of claim 4, wherein the oxidation core vessel oxidizes fuel cell anode tail gas to produce a hot exhaust gas.

6. The compact fuel processor of claim 5, wherein the hot exhaust gas preheats the hydrocarbon fuel.

7. The compact fuel processor of claim 5, further comprising an electric heater for preheating the anode tail gas prior to introducing the anode tail gas to the oxidation core vessel.

8. The compact fuel processor of claim 4, wherein the hydrocarbon fuel feed is sequentially introduced to the first annular space, then to the second annular space, then to the third annular space, and then to the fourth annular space to produce the hydrogen rich gas.

9. The compact fuel processor of claim 4, further comprising a plurality of cooling coils for removing the heat of reaction produced in the first annular space, the second annular space, the third annular space, and the fourth annular space.

10. The compact fuel processor of claim 9, wherein a circulating coolant flows through the cooling coils.

11. The compact fuel processor of claim 10, wherein the circulating coolant is selected from a group consisting of air, water, and the hydrocarbon fuel feed.

12. The compact fuel processor of claim 4, wherein each annular space is surrounded by heat resisting refractory.

13. A compact fuel processor for converting a hydrocarbon fuel feed into hydrogen rich gas, comprising:

a heat exchanger coil;

a reforming core vessel containing an autothermal reforming catalyst bed;

a desulfurizing vessel surrounding the reforming core vessel and forming a first annular space filled with desulfurization catalyst;

a shift vessel surrounding the desulfurizing vessel and forming a second annular space filled with water gas shift catalyst; and a preferred oxidation vessel surrounding the shift vessel and forming a third annular space filled with preferred oxidation catalyst; and wherein the hydrocarbon fuel feed is preheated by the hydrogen rich gas in the heat exchanger coil to produce a preheated hydrocarbon fuel feed; and wherein the preheated hydrocarbon fuel feed is sequentially introduced to the reforming core vessel, then to the second annular space, then to the third annular space, and then to the fourth annular space to produce the hydrogen rich gas.

* * * * *